E. PARKER.
Track-Rails for Sliding-Doors.
No. 6,038. Reissued Sept. 1, 1874.
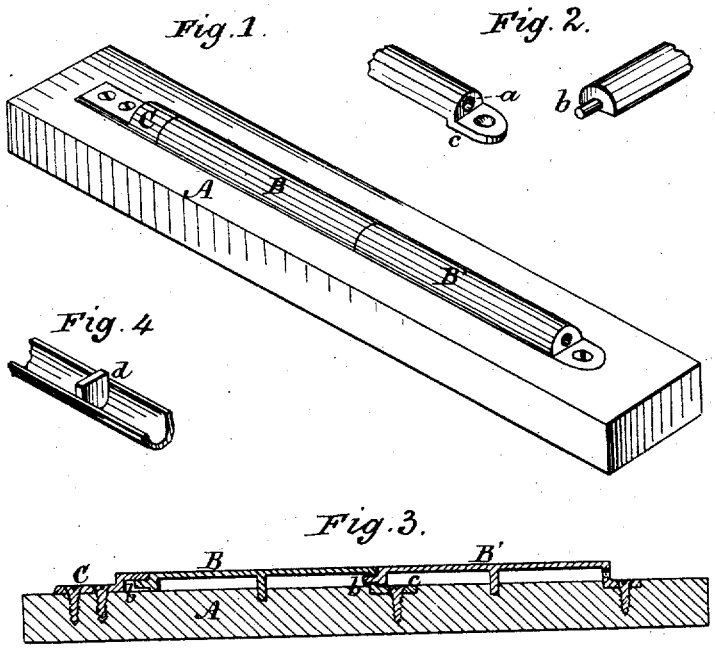
Witnesses.
Philip F. Larner
A. B. Cauldwell
Inventor.
Emery Parker
By Wm. C. Wood
Atty.
THE GRAPHIC CO. PHOTO-LITH. 39 & 41 PARK PLACE, N.Y.

UNITED STATES PATENT OFFICE.

EMERY PARKER, OF NEW BRITAIN, CONNECTICUT, ASSIGNOR TO THE RUSSELL AND ERWIN MANUFACTURING COMPANY.

IMPROVEMENT IN TRACK-RAILS FOR SLIDING DOORS.

Specification forming part of Letters Patent No. 107,530, dated September 20, 1870; reissue No. 6,038, dated September 1, 1874; application filed July 8, 1874.

*To all whom it may concern:*

Be it known that I, EMERY PARKER, of New Britain, in the county of Hartford and State of Connecticut, have invented a new and Improved Track-Rail for Sliding Doors; and I do hereby declare that the following specification, taken in connection with the drawing making a part of the same, is a full, clear, and exact description thereof.

Figure 1 is a perspective view of the rail as applied to the floor. Fig. 2 shows the ends of the abutting sections. Fig. 3 is a longitudinal section of the rail. Fig. 4 shows a brace for stiffening the rail when secured to the floor.

Track-rails for sliding doors have heretofore been usually made with projecting lips, through which the screws to hold the rail to the floor are inserted, or, in some instances, the holding-screws have been inserted in holes made through the rail itself, the ends of the holes being countersunk to receive the screw-heads.

The purpose of my improvement is to provide a means for securing the rail to the floor without showing either a lip or screw-heads, and thus, in addition to the improvement in appearance, enable the carpet to be laid close up to the rail.

In the drawing, A may represent the floor upon which the track-rail is to be laid. B B′ are sections of rails composing the track, which may be extended in length by the addition of any desired number of sections. C is a buttress-block, of metal, which is set between the walls, within which the door slides, and may be the end of any suitable track-rail which has been laid between such walls for the door, provided it is furnished with a hole, *a*, in its end, or otherwise suitably constructed to receive the dowel-pin *b* belonging to the first section of the improved track-rail, Fig. 2. Each section of the track-rail is furnished at one end with a lip, *c*, through which a screw is to be inserted to hold the section to the floor; and it will be better to make such lip extend below the plane of the bottom of the rail, so that it will require to have a mortise cut in the floor for its reception.

The abutting ends of the sections should be connected by a slip-joint to enable each successive section of track as it is laid to be slid endwise over the lip *c* of the next preceding section of rail, and accordingly one end of each section is furnished with a dowel-pin or tenon, *b*, which is to be entered into a hole or socket, *a*, of proper size to receive it made in the end of the next abutting section.

Midway, or at other convenient point between the ends of the sections, a brace, *d*, may be attached, which projects, as shown at Fig. 4, below the bottom of the rail, and is to be entered into a mortise cut in the floor, to prevent the rail from springing laterally.

In this way it will be seen that a track-rail of any desired length can be laid and composed, if preferred, of many sections, which, when laid in the floor, will not show in the space exposed to view in the room when the doors are open any side flange or screw fastening.

What I claim as my invention, and desire to secure by Letters Patent, is—

1. An improved track-rail for sliding doors composed of sections B B, connected by a slip-joint, which serves also to conceal the floor-fastening, substantially as described.

2. The combination of the brace *d*, the slip-joint connection of the sections of rails, and the lip *c* fitted for a floor-fastening as a means for securing the track-rail in place on the floor, substantially as described.

EMERY PARKER.

Witnesses:
M. C. OGDEN,
RICHD. P. BRUFF.